(12) United States Patent
Reusch (10) Patent No.: US 11,062,481 B2
(45) Date of Patent: Jul. 13, 2021

(54) HANDHELD DEVICE AND METHOD FOR DETERMINING A PLANT STATUS

(71) Applicant: YARA INTERNATIONAL ASA, Oslo (NO)

(72) Inventor: Stefan Reusch, Dülmen (DE)

(73) Assignee: YARA INTERNATIONAL ASA, Oslo (NO)

(*) Notice: Subject to any disclaimer, the term of this patent is extended or adjusted under 35 U.S.C. 154(b) by 27 days.

(21) Appl. No.: 16/472,992

(22) PCT Filed: Dec. 27, 2017

(86) PCT No.: PCT/EP2017/084614
§ 371 (c)(1),
(2) Date: Jun. 24, 2019

(87) PCT Pub. No.: WO2018/122242
PCT Pub. Date: Jul. 5, 2018

(65) Prior Publication Data
US 2020/0090372 A1    Mar. 19, 2020

(30) Foreign Application Priority Data

Dec. 29, 2016  (EP) ...................... 16207315
May 26, 2017  (EP) ...................... 17173079

(51) Int. Cl.
| *G06K 9/62* | (2006.01) |
| *G06T 7/90* | (2017.01) |
| *G06K 9/00* | (2006.01) |
| *G06K 9/46* | (2006.01) |
| *G06T 7/00* | (2017.01) |

(52) U.S. Cl.
CPC .......... *G06T 7/90* (2017.01); *G06K 9/00657* (2013.01); *G06K 9/4652* (2013.01);
(Continued)

(58) Field of Classification Search
CPC .. A01G 7/00; G06K 2209/17; G06K 9/00657; G06K 9/4652;
(Continued)

(56) References Cited

U.S. PATENT DOCUMENTS 9,075,008 B2    7/2015  Holland
2014/0293091 A1*  10/2014  Rhoads ................ G01J 3/2823
                                                             348/234
(Continued)

FOREIGN PATENT DOCUMENTS

| DE | 10 2012 010 912 | 8/2013 |
| EP | 1 429 594 | 1/2005 |
| WO | 2015/077493 | 5/2015 |

OTHER PUBLICATIONS

International Search Report dated Feb. 14, 2019 in International (PCT) Application No. PCT/EP2017/084614.
(Continued)

*Primary Examiner* — Xin Jia
(74) *Attorney, Agent, or Firm* — Wenderoth, Lind & Ponack, L.L.P.

(57) ABSTRACT

The invention relates to a handheld device and method for determining a status of one or more plants. The device includes a digital color camera arranged for obtaining a color image of plants within a field of view, a light source arranged for providing broadband illumination to the plants within the field of view, and a processing unit arranged for controlling the camera and the light source for obtaining a first image of the plants while the light source illuminates the plants with broadband illumination, and obtaining a second image of the plants while the light source does not illuminate the plants.

16 Claims, 2 Drawing Sheets

(52) U.S. Cl.
CPC ........ *G06T 7/0002* (2013.01); *G06K 2209/17* (2013.01); *G06T 2207/10024* (2013.01); *G06T 2207/30188* (2013.01)

(58) Field of Classification Search
CPC . G06T 2207/10024; G06T 2207/10152; G06T 2207/20104; G06T 2207/20224; G06T 2207/30188; G06T 7/0002; G06T 7/90
See application file for complete search history.

(56) References Cited

U.S. PATENT DOCUMENTS

| | | |
|---|---|---|
| 2016/0307040 A1 | 10/2016 | Shulman |
| 2016/0367135 A1 | 12/2016 | Myung et al. |
| 2017/0131200 A1* | 5/2017 | Raveh ................... G01N 21/23 |
| 2017/0358106 A1* | 12/2017 | Yoshimura ............ G06F 16/951 |

OTHER PUBLICATIONS

European Search Report dated Mar. 9, 2018 in corresponding European Patent Application No. 17173079.9.
Examination Report dated Feb. 12, 2021 in corresponding Australian Patent Application No. 2017387704.
Rigon J P et al, "A novel method for the estimation of soybean chlorophyll content using a smartphone and image analysis", Photosynthetica, Kluwer, Dordrecht, NL, vol. 54, No. 4, doi:10.1007/511099-016-0214-X, ISSN 0300-3604, Mar. 7, 2016, pp. 559-566, Mar. 7, 2016.

* cited by examiner

HANDHELD DEVICE AND METHOD FOR DETERMINING A PLANT STATUS

FIELD OF THE INVENTION

The invention relates to a device and a method for determining a plant status, more in particular a nutritional status of a plant.

BACKGROUND TO THE INVENTION

It is known to determine a plant status, such as a plant nutritional status with the help of chlorophyll content. The chlorophyll content is usually determined by means of optical (e.g. reflectance or transmittance) measurements. However, devices for determining the plant status can be large, sophisticated, cumbersome to deploy and/or expensive.

PRIOR ART

WO 2015077493 A1 (Digimarc Corporation, 28 May 2015) discloses a smartphone, adapted for use as an imaging spectrometer, by synchronized pulsing of different LED light sources as different image frames are captured by the phone's CMOS image sensor. A particular implementation employs the CIE color matching functions, and/or their orthogonally transformed functions, to enable direct chromaticity capture. The spectral images are processed for use in object identification, classification, and a variety of other applications. Particular applications include produce (e.g., fruit or vegetable) identification.

U.S. Pat. No. 9,075,008 B2 (Kyle H. Holland, 3 Mar. 2011) discloses a method and system for treating a plant, comprising measuring optical properties of a plant using at last three spectral bands; calculating in a computational device at least two difference vegetative indexes using the optical properties, each of the at least two vegetative indexes correlating to one or more plant growth parameters; calculating in the computational device a water invariant chlorophyll index from the at least two difference vegetative indexes using the at least three spectral bands; and treating one or more of the plants based on the water invariant chlorophyll index.

EP 1429594 B1 (Norsk Hydro ASA, 3 Apr. 2003) discloses a method for determining and influencing the state of plants in a contactless manner, in particular the patch-specific or site-specific fertilizing of plants, in which the plants are illuminated by a modulated artificial halogen or xenon light source by means of a light spot or light strip during traversal with a carrier, the reflection signals of the foliage of the plants are captured in the visible and/or near-infrared spectral range by means of detectors and passed on to an evaluation and signal processing unit for determining biophysical parameters such as biomass, chlorophyll and/or water content and a measurement for the nutrition level of the plants is derived therefrom, which a computer uses to control the appropriate quantity of fertilizer to be applied as a target variable.

SUMMARY OF THE INVENTION

It is an objective to provide a simple, easy to use, easy to deploy and/or inexpensive system. More in general, it is an objective to provide an improved system for determining a status of a plant.

According to an aspect is provided a handheld device for determining a status of plants, in particular according to claim 1. The handheld device provides the advantage that the determination can easily be performed in situ, e.g. on the field. The device includes a digital color camera arranged for obtaining a color image of plants within a field of view. The color image includes pixels, each of which comprises at least a red (R), green (G) and blue (B) color component, together forming a set of color components. The device includes a light source arranged for providing broadband illumination at least to the plants within the field of view. The broadband illumination can e.g. be provided by a white light source, such as a white LED. The device includes a processing unit. The processing unit is arranged for controlling the camera and the light source for obtaining a first image of the plants while the light source illuminates the plants with the broadband illumination. The processing unit is arranged for obtaining a second image of the plants while the light source does not illuminate the plants. The processing unit is arranged for determining a first color value representative of a difference in intensity values in the first and the second image for a first of the color components. The processing unit is arranged for determining a second color value representative of a difference in intensity values in the first and the second image for a second of the color components. The processing unit is arranged for calculating a value representative of a status of the plants using the first color value and the second color value.

Determining the value representative of a status of the plants on the basis of the first image, i.e. with illumination by the light source, and the second image, i.e. without illumination by the light source provides the advantage that effects of ambient lighting conditions can be suppressed. Hence, reliability of the device is greatly enhanced. Also reproducibility of the determination can be enhanced. It will be appreciated that in general the device and method can be used for determining the value representative of a status of an object.

The processing unit can be arranged for calculating the value representative of the status of the plants by determining the first color value as the difference of the pixel-averaged intensity value (i.e. the intensity value averaged over all pixels for the given color component) in the first image and in the second image for the first of the color components; determining the second color value as the difference of the pixel-averaged intensity value (i.e. the intensity value averaged over all pixels for the given color component) in the first and in the second image for the second of the color components; and calculating the value representative of the status of the plants using the first color value and the second color value. Hence, the value, S, representative of the status of the plants is a function, f, of the average intensity value, $\overline{I_{1,ON}}$, in the first image and, $\overline{I_{1,OFF}}$, in the second image for the first of the color components and of the average intensity value, $\overline{I_{2,ON}}$, in the first and, $\overline{I_{2,OFF}}$, in the second image for the second of the color components:

$$S = f((\overline{I_{1,ON}} - \overline{I_{1,OFF}}), (\overline{I_{2,ON}} - \overline{I_{2,OFF}})). \quad \text{EQ1}$$

Here the first color value is $V_1 = (\overline{I_{1,ON}} - \overline{I_{1,OFF}})$, and the second color value is $V_2 = (\overline{I_{2,ON}} - \overline{I_{2,OFF}})$.

By using an average intensity value for the image or part of the image, information on spatial distribution of the intensity value is discarded. As a result mismatch errors, that typically occur if the object and/or the camera is moved between taking the first and second image, can be reduced. Nevertheless, in this way intensity values relating to mutually different portions of the image, e.g. to different leaves of one or more plants, at different locations (e.g. different heights) in the canopy, are simultaneously taken into account for determining an average intensity value. Hence, measurement errors can be reduced.

The processing unit can be arranged for calculating the value representative of the status of the plants by determining the first color value as an average of the difference in intensity values per pixel in the first and the second image for the first of the color components; determining the second color value as an average of the difference in intensity values per pixel in the first and the second image for the second of the color components; and calculating the value representative of the status of the plants using the first color value and the second color value. Hence, the value, S, representative of the status of the plants is a function, f, of the intensity value, $I_{1,ON,i}$, per pixel, i, in the first image and, $I_{1,OFF,i}$, in the second image for the first of the color components and of intensity value, $I_{2,ON,i}$, per pixel in the first and, $I_{2,OFF,i}$, in the second image:

$$S = f\left(\left(\frac{1}{n}\sum_{i=1}^{n} I_{1,ON,i} - I_{1,OFF,i}\right), \left(\frac{1}{n}\sum_{i=1}^{n} I_{2,ON,i} - I_{2,OFF,i}\right)\right). \quad \text{EQ 2}$$

Here the first color value is $$V_1 = \left(\frac{1}{n}\sum_{i=1}^{n} I_{1,ON,i} - I_{1,OFF,i}\right),$$

and the second color value is $$V_2 = \left(\frac{1}{n}\sum_{i=1}^{n} I_{2,ON,i} - I_{2,OFF,i}\right).$$

The processing unit can be arranged for calculating the value representative of the status of the plants by determining the first color value as the difference in intensity values in the first and the second image for the first of the color components per pixel; determining the second color value as the difference in intensity values in the first and the second image for the second of the color components per pixel; and calculating the value representative of the status of the plants by averaging a pixelwise value representative of the status of the plants obtained using the first color value per pixel and the second color value per pixel. Hence, the value, S, representative of the status of the plants is a function, f, of the intensity value, $I_{1,ON,i}$, per pixel, i, in the first image and, $I_{1,OFF,i}$, in the second image for the first of the color components and of intensity value, $I_{2,ON,i}$, per pixel in the first and, $I_{2,OFFi}$, in the second image:

$$S_i = f((I_{1,ON,i} - I_{1,OFF,i}), (I_{2,ON,i} - I_{2,OFF,i})), \quad \text{EQ 3}$$

$$S = \frac{1}{n}\sum_{i=1}^{n} S_i. \quad \text{EQ 4}$$

Here the first color value is $V_{1,i} = (I_{1,ON,i} - I_{1,OFF,i})$ for the $i^{th}$ pixel, and the second color value is $V_{2,i} = (I_{2,ON,i} - I_{2,OFF,i})$ for the $i^{th}$ pixel.

It will be appreciated that it is possible to perform the calculations on the basis of all pixels in the images. It is also possible to perform the calculations on the basis of a subset of the pixels in the images. It is possible that the subset is determined e.g. by a user (e.g. selecting a region on a screen) or by the processing unit (e.g. image recognition procedure, for example selecting pixels belonging to the image of a leaf, plurality of leaves, fruit, or the like). It is possible that the subset is determined by, e.g. automatically, selecting those pixels which fulfil a certain criterion, or certain criteria (e.g. all pixels identified as "green", which causes non-green elements such as soil, fingertips, feet, etc., to be disregarded in the calculations).

It will be appreciated that averaging may be performed using all pixels in the image. It is also possible to perform the averaging using a subset of the pixels in the image. It is possible that the subset is determined e.g. by a user (e.g. selecting a region on a screen) or by the processing unit (e.g. image recognition procedure, for example selecting pixels belonging to the image of a leaf, plurality of leaves, fruit, or the like). It is possible that the subset is determined by, e.g. automatically, selecting those pixels which fulfil a certain criterion, or certain criteria (e.g. all pixels identified as "green", which causes non-green elements such as soil, fingertips, feet, etc., to be disregarded in averaging).

The above ways of calculating the value representative of the status of the plants can also be used for each a plurality of blocks of pixels of the first and second image. An eventual value representative of the status of the plants can be calculated by averaging such blockwise values representative of the status of the plants obtained.

Optionally, the processing unit is arranged for, in step (iii), calculating the value, S, representative of the status of the plants based on a ratio of the first color value and the second color value. Hence S can be denoted as $S = V_1/V_2$. Herein V1, and V2 can be determined as above (including $V_{1,i}$ and $V_{2,i}$ and subsequent averaging over the pixels.

The processing unit can for instance be arranged for calculating the value, S, representative of the status of the plants as:

$$S = \frac{\overline{I_{1,ON}} - \overline{I_{1,OFF}}}{\overline{I_{2,ON}} - \overline{I_{2,OFF}}} \quad \text{EQ 5}$$

wherein $\overline{I_{1,ON}}$ is a first color component intensity value, averaged over a plurality of pixels of the first image, $\overline{I_{1,OFF}}$ is a first color component intensity value, averaged over a plurality of pixels of the second reference image, $\overline{I_{2,ON}}$ is a second color component intensity value, averaged over a plurality of pixels of the first reference image, and $\overline{I_{2,OFF}}$ is a second color component intensity value, averaged over a plurality of pixels of the second reference image.

The processing unit can, for instance, be arranged for calculating the value, S, representative of the status of the plants as $$S = \frac{1}{n}\sum_{i=1}^{n} \frac{I_{1,ON,i} - I_{1,OFF,i}}{I_{2,ON,i} - I_{2,OFF,i}} \quad \text{EQ 6}$$

wherein $I_{1,ON,i}$ is a first color component intensity value for an $i^{th}$ pixel of the first reference image, $I_{1,OFF,i}$ is a first color component intensity value for the $i^{th}$ pixel of the second reference image, $I_{2,ON,i}$ is a second color component intensity value for the $i^{th}$ pixel of the first reference image, and $I_{2,OFF,i}$ is a second color component intensity value for the $i^{th}$ pixel of the second reference image, and n is the number of pixels.

There is a relationship between leaf greenness and plant nitrogen status. Hence, plant nitrogen requirements can be determined based on measurement data collected from the plant leaves. Leaves of plants with increased levels of nitrogen typically have more chlorophyll and greater rates of photosynthesis. Hence, plants that appear a darker green are perceived to be healthier than nitrogen deficient plants. Hence, it is possible to remotely sense or measure leaf greenness and obtain an indication of chlorophyll concentration and plant nitrogen status.

Furthermore, also other properties, representative of a plant status may be monitored, based on the disclosed color method, such as ripeness (e.g. tomatoes, pumpkins, wheat, barley, corn, etc.) and for this, appropriate color values should be determined and a value representative of a status of the plants should be calculated.

Optionally, the first of the color components is green (G) and the second of the color components is red (R). This provides the advantage that the value representative of the status of the plants is highly sensitive to green. The green image component can be representative of chlorophyll content. The red image component can be largely, or totally, independent of chlorophyll content. The ratio of the green image component to the red image component can be used to approximate a normalized value related to chlorophyll content. Hence, reliability of the device is greatly enhanced. The green image component can be representative of chlorophyll content. The red image component can be largely, or totally, independent of chlorophyll content. Hence, the red image component can be used to suppress background illumination effects not related to chlorophyll content. Hence, reliability of the device is greatly enhanced.

Although the intensity of the green color component and the red color component can be dependent on distance from the light source to the plant, using ratio of the green image component and the red image component can also be used to make the measurement result, i.e. the ratio, independent from measuring distance.

Optionally, the processing unit is further arranged for determining a third color value representative of a difference in intensity values in the first and the second image for a third of the color components, and calculating the value representative of the status of the plants using the first color value, the second color value, and the third color value.

It will be appreciated that the third color value can be determined as the difference of the average intensity value in the first image and in the second image for the third of the color components; or as an average of the difference in intensity values per pixel in the first and the second image for the third of the color components; or as the difference in intensity values in the first and the second image for the third of the color components per pixel.

Optionally, the processing unit is arranged for, in step (iii), calculating the value representative of the status of the plants based on a ratio of the first color value and the second color value, e.g. as in EQ5 or EQ6. Using a ratio of two color values allows to calculate a value representative of a plant status wherein sensitivity for the first color value is increased by using the second color value as reference.

Optionally, the processing unit is arranged for, in step (iii), calculating said value representative of the status of the plants based on a hue value using the first, second and third color value. The hue value $h_{RGB}$ can be conventionally calculated as $$h_{RGB} = a\tan 2(\sqrt{3}(V_G - V_B), 2V_R - V_G - V_B) \qquad \text{EQ7}$$

wherein $V_R$ is the first color value, wherein red is chosen as the first of the color components, $V_G$ is the second color value, wherein green is chosen as the second of the color components, and $V_B$ is the third color component wherein blue is chosen as the third of the color components. The function a tan 2 is the arctangent function with two arguments. For any real number arguments x and y not both equal to zero, a tan 2(y, x) is the angle in radians between the positive x-axis of a plane and the point given by the coordinates (x, y) on it. The angle is positive for counter-clockwise angles (upper half-plane, y>0), and negative for clockwise angles (lower half-plane, y<0). The purpose of using two arguments instead of one, i.e. just computing a a tan(y/x), is to gather information on the signs of the inputs in order to return the appropriate quadrant of the computed angle, which is not possible for the single-argument arctangent function. It also avoids the problem of division by zero, as a tan 2(y, 0) will return a valid answer as long as y is non-zero. The hue value can be representative of chlorophyll content. A darker green may indicate a higher chlorophyll content, a lighter green may indicate a lower chlorophyll content. A lighter green may indicate a nitrogen deficiency. The hue value can also be representative of other plant status, such as ripeness (e.g. tomatoes, pumpkins, wheat, barley, etc.).

The value representative of the status of the plants can also be determined as other mathematical combination of the first, second, and optionally third color values, V1, V2 and V3. For example, S=(V1−V2)/V3, S=(V1+V2)/2, S=V1/(V2−V3), etc. In order for the value S to be insensitive to measurement distance, preferably a ratio of color values is used.

The processing unit can be arranged for determining the value representative of a status of the plants from hue, saturation, and/or brightness from hue-saturation-brightness (HSB) color space. Herein hue, saturation and brightness can be defined as $$Hue = \begin{cases} 60 \times \left( \dfrac{V_G - V_B}{\max(V_R, V_G, V_B) - \min(V_R, V_G, V_B)} \right), & \max(V_R, V_G, V_B) = V_R \\ 60 \times \left( 2 + \dfrac{V_B - V_R}{\max(V_R, V_G, V_B) - \min(V_R, V_G, V_B)} \right), & \max(V_R, V_G, V_B) = V_G \\ 60 \times \left( 4 + \dfrac{V_G - V_B}{\max(V_R, V_G, V_B) - \min(V_R, V_G, V_B)} \right), & \max(V_R, V_G, V_B) = V_B \end{cases}$$

$$Saturation\ (Sat) = \begin{cases} 0, & \max(V_R, V_G, V_B) = 0 \\ \dfrac{\max(V_R, V_G, V_B) - \min(V_R, V_G, V_B)}{\max(V_R, V_B, V_B)}, & \max(V_R, V_G, V_B) \neq 0 \end{cases}$$

$$Brightness\ (B') = \dfrac{\max(V_R, V_G, V_B)}{255}.$$

The value representative of a status of the plants can e.g. be the hue, the saturation, or the brightness as determined above, or a combination thereof.

The processing unit can be arranged for determining the value representative of a status of the plants from a difference between the red and green color values, e.g. $S=V_G-V_R$.

The processing unit can be arranged for determining the value representative of a status of the plants from a ratio of the green and red color values, e.g. $S=V_G/V_R$.

The processing unit can be arranged for determining the value representative of a status of the plants from a vegetation index VI, e.g. $S=VI=(V_G-V_R)/(V_G+V_R)$.

The processing unit can be arranged for determining the value representative of a status of the plants from a dark green color index $$(DGCI), \text{e.g.} \quad S = DGCI = \left[\left(\frac{Hue}{60} - 1\right) + (1 - Sat) + (1 - B')\right]/3.$$

Optionally, the processing unit is arranged for calibrating the first color value, second color value, and optional third color value. This provides the advantage that deviations in illumination and/or camera can be accounted for. Hence, for example, deviations in the spectral composition of the light source and/or the spectral sensitivity of the camera can be accounted for.

Calibration can include obtaining, with the camera, a first reference image of a reference object with a, preferably known, uniform reflectance while the light source illuminates the reference object with the broadband illumination, and obtaining a second reference image of the reference object while the light source does not illuminate the reference object.

The processing unit can be arranged for calibrating the first, second or third color value by for that color value multiplying the color value by a calibration value, C, determined as a reference value, K, divided by the difference of the average intensity value $\overline{I_{C,ON}}$ in the first reference image and the average intensity value $\overline{I_{C,OFF}}$ in the second reference image for that color component:

$$C = \frac{K}{\overline{I_{C,ON}} - \overline{I_{C,OFF}}}. \qquad \text{EQ 8}$$

The processing unit can be arranged for calibrating the first, second or third color value by for that color value multiplying the color value by a calibration value, C, determined as a reference value, K, divided by an average of the difference in intensity values per pixel in the first reference image and the second reference image for that color component:

$$C = \frac{K}{\frac{1}{m}\sum_{i=1}^{m}(I_{C,ON,i} - I_{C,OFF,i})}. \qquad \text{EQ 9}$$

Herein $I_{C,ON,i}$ is the intensity value for that color component for an $i^{th}$ pixel of the first reference image, $I_{C,OFF,i}$ is the intensity value for that color component for the $i^{th}$ pixel of the second reference image, and m is the number of pixels.

The processing unit can be arranged for calibrating the first, second or third color value by for that color value by per pixel multiplying the color value by a calibration value, $C_i$ determined as a reference value, K, divided by the difference in intensity values in the first reference image and the second reference image for the that color component per pixel:

$$C_i = \frac{K}{I_{C,ON,i} - I_{C,OFF,i}}. \qquad \text{EQ 10}$$

Herein $I_{C,ON,i}$ is the intensity value for that color component for an $i^{th}$ pixel of the first reference image, and $I_{C,OFF,i}$ is the intensity value for that color component for the $i^{th}$ pixel of the second reference image.

The processing unit can be arranged for calibrating the first, second or third color value by per block, b, of pixels for that color value multiplying the color value by a calibration value, $C_b$, determined as a reference value, K, divided by an average of the difference in intensity values per pixel in the first reference image and the second reference image for that color component:

$$C_b = \frac{K}{\frac{1}{p}\sum_{i=1}^{p}(I_{C,ON,i} - I_{C,OFF,i})}. \qquad \text{EQ 11}$$

Herein $I_{C,ON,i}$ is the intensity value for that color component for an $i^{th}$ pixel of the first reference image, $I_{C,OFF,i}$ is the intensity value for that color component for the $i^{th}$ pixel of the second reference image, and p is the number of pixels in the block.

The reference value, K, can be a constant, such as a maximum possible intensity value, a maximum intensity value encountered in the first reference image for that color component, a maximum difference in average intensity values in the first reference image and the second reference image for that color component, etc. The reference value, K, can represent the reflectance of the reference material at the respective color component.

It will be appreciated that in case the processing unit calculates the value representative of the status of the plants based on a ratio of the first color value and the second color value, that the reference values K for the calibration constant $C_1$ for the first color value and the calibration constant $C_2$ for the second color value may disappear from the equation, e.g. if the reference value K is the same for all color components. For example, when using the calibrated form of equation EQ5:

$$S = \left(\frac{\overline{I_{1,ON}} - \overline{I_{1,OFF}}}{\overline{I_{2,ON}} - \overline{I_{2,OFF}}}\right) \cdot \left(\frac{\overline{I_{C,2,ON}} - \overline{I_{C,2,OFF}}}{\overline{I_{C,1,ON}} - \overline{I_{C,1,OFF}}}\right) \qquad \text{EQ 12}$$

With $\overline{I_{C,1,ON}}$ the average intensity value in the first reference image for the first of the color components, etc.

Optionally, at least one color component is chosen to be less sensitive to changes in the plant status than the other color component(s). Optionally, the first of the color components is selected to be related to the plant color of which a status is to be determined, and wherein the second of the color components is selected to be less or not related to said plant color.

Optionally, the processing unit is arranged for, in step (iii), calculating a value representative of a color status of an object, using the intensity of one or more of the color components.

Optionally, the processing unit is arranged for controlling the camera and the light source for obtaining the first and second image in response to a single user command. Hence, a single user command starts a measurement sequence in which both the first and second image are automatically obtained. Preferably, the first and second image are obtained in fast succession. The first and second image can e.g. be obtained within 1 second, preferably within <100 ms, more preferably within <10 ms. Hence, measurement errors due to motion of the camera and/or the plants are reduced. For example, an exposure time of the camera can be ¹⁄₂₅₀ s (4 ms), and a delay time between the first and second image can e.g. be 125 ms.

According to an aspect, the camera is arranged for determining for each pixel in an image a red intensity value, a green intensity value and a blue intensity value. The camera can be an RGB camera. The green image component can be the green pixel values for the pixels in the image. The red image component can be the red pixel values for the pixels in the image.

According to an aspect the processing unit is arranged for determining the value representative of a status of the plants, G/R, as:

$$G/R = 100 * \left( \frac{G1 - G0}{R1 - R0} * C - 1 \right). \quad \text{EQ 13}$$

Herein G1 is a first average green intensity value for a plurality of pixels of the first image, and G0 is a second average green intensity value for a plurality of pixels of the second image. Herein R1 is a first average red intensity value for a plurality of pixels of the first image, and R0 is a second average red intensity value for a plurality of pixels of the second image. C is a calibration constant. It will be appreciated that G1, G0, R1 and R0 preferably relate to the same plurality of pixels. The plurality of pixels can be a predetermined area within the images, e.g. a center area. The plurality of pixels can be a variable area within the images, e.g. an area with intensity values higher than a threshold value. The plurality of pixels can be all pixels within the images.

The calibration constant C can be determined by obtaining a first reference image of a reference object having a uniform reflectance while the light source illuminates the reference object with broadband illumination, and obtaining a second reference image of the reference object while the light source does not illuminate the reference object. The reference object can e.g. be a grey reference panel. The calibration constant can be defined as:

$$C = \frac{Rr1 - Rr0}{Gr1 - Gr0}. \quad \text{EQ 14}$$

Herein Gr1 is a first average green intensity value for a plurality of pixels of the first reference image, and Gr0 is a second average green intensity value for a plurality of pixels of the second reference image. Herein Rr1 is a first average red intensity value for a plurality of pixels of the first reference image, and Rr0 is a second average red intensity value for a plurality of pixels of the second reference image. The calibration constant can e.g. compensate for camera-specific and/or light-source specific offsets of the device.

It will be appreciated that the calibration constant as defined hereinabove can be determined only once for a device. However, when the device is suspect of degradation, e.g. due to component degradation or contamination, the calibration constant may be determined anew. It will be appreciated that it is also possible that the calibration constant is determined only once for a specific type of device. When the (opto)electronic components of all devices of the type are identical, a single determination of the calibration constant for all devices of that type may suffice.

According to an aspect, the camera includes a first polarization filter, and the light source includes a second polarization filter. Optionally, the first and second polarization filters are cross-polarized. This provides the advantage that specular reflection of light on the plant, e.g. leaf, surface can be suppressed.

According to an aspect the device includes a communications unit arranged for communicating the determined status of the plants, or a parameter derived therefrom, to an applicator system, such as a fertilizer system, watering system, ventilating system, heating system, or the like.

Optionally, the device includes a position determination unit, such as a GPS unit, for determining location information of the device. The device can then be arranged to store the status of the plants, or a parameter derived therefrom, in combination with the location information. Alternatively, or additionally, the device can be arranged for communicating the determined status of the plants, or a parameter derived therefrom, in combination with the location information to an applicator system, e.g. a variable rate applicator system, such as a variable rate fertilizer system. Hence, the use of fertilizers may be reduced by precisely applying agricultural products to individual plants or locations to be treated.

According to an aspect, the device includes a smartphone or tablet. The camera, light source, processing unit and optional communications unit and position determination unit can be part of the smartphone or tablet. This provides the advantage that a compact device can be provided in a simple manner.

Optionally, the polarization filters can be included in a casing for the smartphone or tablet. The casing can e.g. be arranged to be clicked onto the smartphone or tablet.

According to an aspect is provided a casing for a smartphone or tablet including a first polarization filter positioned to cover a camera lens of the smartphone or tablet, and a second polarization filter positioned to cover an illumination unit of the smartphone or tablet. The first and second polarization filters can be linear polarization filters, e.g. arranged with their polarization directions oriented substantially orthogonal.

According to an aspect is provided a computer program product for determining a status of plants. The computer program product includes software code portions arranged for, when executed on a programmable device, causing the device to obtain a first image of plants with a digital color camera of the device while a light source of the device illuminates the plants with broadband illumination, obtain a second image of the plants with the digital color camera while the light source does not illuminate the plants, the first and second images including pixels, each of which comprises at least a red (R), green (G) and blue (B) color component, together forming a set of color components, determine a first color value representative of a difference in intensity values in the first and the second image for a first of the color components, determine a second color value representative of a difference in intensity values in the first and the second image for a second of the color components, and calculate a value representative of a status of the plants using the first color value and the second color value.

Optionally, the computer program product is included in a non-transitory data storage device. The computer program product can e.g. be an app for the smartphone or tablet. Optionally, the app can be downloaded from a communications network, such as the internet.

According to an aspect is provided a combination of said casing and a token for obtaining and/or enabling said computer program product. The token can e.g. be an indication of a location where to download the computer program product, such as a URL. The token can be an authorization code for authorizing download and/or use of the computer program product (e.g. enabling the program product to operate, or fully operate), e.g. from an app-store.

According to an aspect is provided a method for determining a status of a plant using a device including a digital color camera, a light source arranged for providing broadband illumination, and a processing unit. The method includes obtaining a first image of the plants with the digital color camera while the light source illuminates the plants with broadband illumination. The method includes obtaining a second image of the plants with the digital color camera while the light source does not illuminate the plants. The first and second images including pixels, each of which comprises at least a red (R), green (G) and blue (B) color component, together forming a set of color components. The method includes determining a first color value representative of a difference in intensity values in the first and the second image for a first of the color components. The method includes determining a second color value representative of a difference in intensity values in the first and the second image for a second of the color components. The method includes calculating a value representative of a status of the plants using the first color value and the second color value. The method preferably is a computer implemented method.

Optionally, the method includes taking an action, such as watering, fertilizing, harvesting, shielding (e.g. from the sun), ventilating, and/or heating, in response to the calculated value representative of a status of the plants. The method can include providing an instruction to an operator or a machine for taking such action. The method can include comparing the value representative of a status of the plants with a threshold value or with a reference function, so as to determine whether or not to take the action.

It will be appreciated that any of the aspects, features and options described in view of the device apply equally to the method, computer program product and combination and vice versa. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1A:
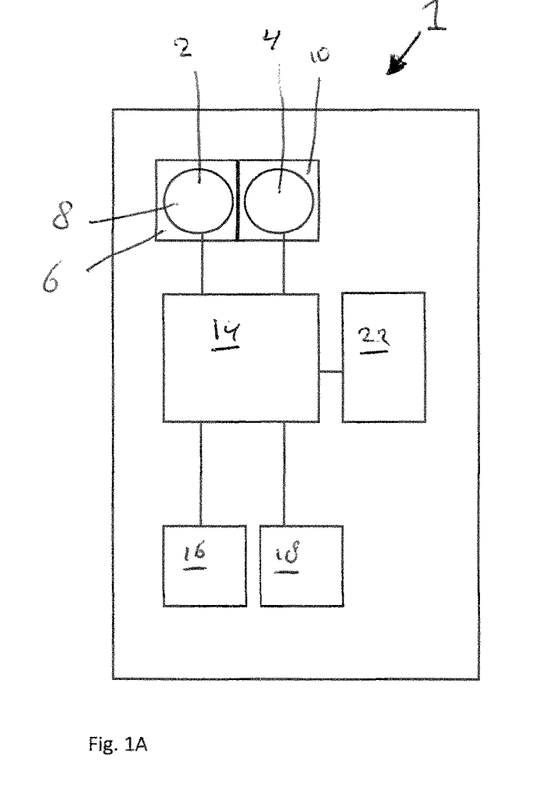
FIGS. 1A and 1B show a schematic representation of a device.
Figure 1B:
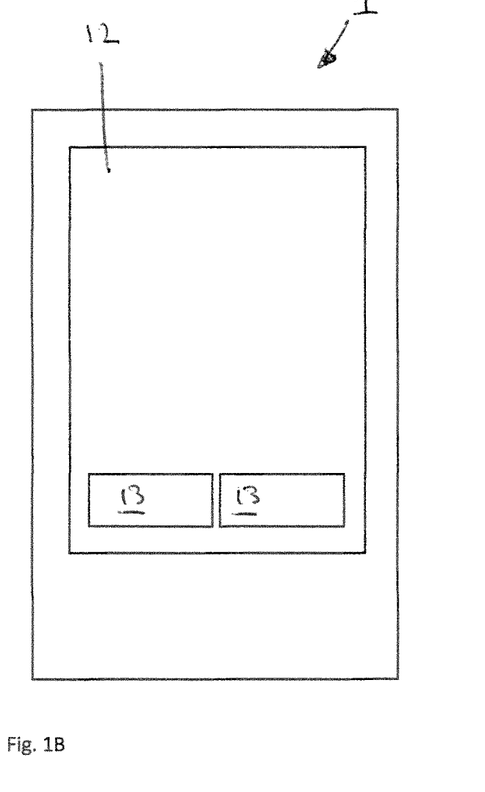

FIGS. 1A and 1B show a schematic representation of a device 1. FIG. 1A shows a front view of the device 1. FIG. 1B shows a rear view of the device 1. The device 1 includes a camera 2 and a light source 4. The camera is a color camera. In this example the camera 2 is an RGB camera. The RGB camera obtains images containing a plurality of pixels. For each pixel in the image the camera 2 determines a red intensity value, a green intensity value and a blue intensity value. In this example, the camera is an 8-bit camera. Hence, each of the red, green and blue intensity values is determined on a scale from 0 to 255. It will be appreciated that a camera providing a, e.g. 10-bit, uncalibrated raw intensity value for each pixel can be used. The output of such camera can be more linearly related to light intensity than the output of an 8-bit camera which can include signal pre-processing carried out by the camera.

In this example the light source is a white light emitting diode, LED. Here the light source 4 is placed adjacent to the camera 2.

In this example, the device 1 includes a first polarization filter 6 placed in front of a lens 8 of the camera 2. The first polarization filter 6 is a linear polarization filter. The device 1 includes a second polarization filter 10 placed in front of the light source 4. The second polarization filter 10 is a linear polarization filter. In this example the first and second polarization filters 6, 10 are positioned such that their orientations of polarization are oriented perpendicularly.

As shown in FIG. 1B, the device 1 includes a user interface 12. Here the user interface 12 includes a touch screen. The user interface includes, i.a., controls 13 for controlling, such as triggering, the camera 2 and the light source 4.

In this example, the device 1 includes a processing unit 14. The processing unit is communicatively connected to the camera 2, the light source 4 and the user interface 12. Here, the device includes a communications unit 16. The communications unit 16 is communicatively connected to the processing unit 14. In this example, the device 1 includes a position determination unit 18, here a global positioning system, GPS, unit. The position determination unit 18 is communicatively connected to the processing unit 14.

The device 1 as described thus far can be used as follows.

Before the device 1 is used for determining a plant status, the device 1 is calibrated. Thereto, the device 1 is held over a reference panel, here a grey panel, having a spectrally uniform reflectance, such that the entire field of view 20 of the device 1 is covered by the reference panel. Via the user interface 12 a calibration measurement sequence is started, e.g. by pressing a "calibrate" button on the touch screen. After activation of the calibration measurement sequence, the processing unit 14 instructs the light source 4 to switch on and instructs the camera 2 to take a first reference image. Next, the processing unit 14 instructs the light source 4 to switch off and instructs the camera 2 to take a second reference image. The first and second reference images can be, e.g. temporarily, stored in a memory 22 of the device 1.

In this example, the processing unit 14 determines an average intensity value Gr1 for all green pixel intensity values of the first reference image. In this example, the processing unit 14 determines an average intensity value Gr0 for all green pixel intensity values of the second reference image. In this example, the processing unit 14 determines an average intensity value R1 for all red pixel intensity values of the first reference image. In this example, the processing unit 14 determines an average intensity value R0 for all red pixel intensity values of the second reference image.

Then, a calibration constant C is calculated using equation EQ15.

$$C = \frac{Rr1 - Rr0}{Gr1 - Gr0} \qquad \text{EQ 15}$$

Figure 2:
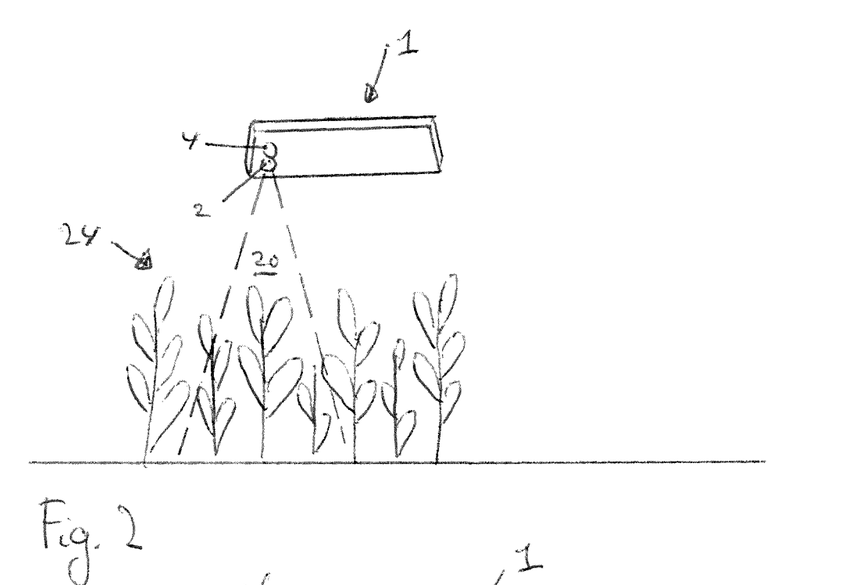
FIG. 2 shows a schematic representation of a device.

Referring now to FIG. 2, a measurement is described. The device 1 is held in or above a crop canopy 24. Via the user interface 12 a measurement sequence is started, e.g. by pressing a button on the touch screen. After activation of the measurement sequence, the processing unit 14 instructs the light source 4 to switch on and instructs the camera 2 to take a first image of the part of the crop canopy within the field of view 20 of the device 1. Next, the processing unit 14 instructs the light source 4 to switch off and instructs the camera 2 to take a second image of the part of the crop canopy 24 within the field of view 20 of the device 1. The first and second image can be, e.g. temporarily, stored in the memory 22 of the device 1.

Here, the processing unit 14 automatically causes the device to take the two images in response to a single user command. The processing unit 14 causes the two images to be taken in fast succession. In this example the images are taken with an exposure time of ¹⁄₂₅₀ s (4 ms) and a delay time between the images of 125 ms. The light source 4 is activated to be on during a period that is equal to or longer than the exposure time.

In this example, the processing unit 14 determines an average intensity value G1 for all green pixel intensity values of the first image. In this example, the processing unit 14 determines an average intensity value G0 for all green pixel intensity values of the second image. In this example, the processing unit 14 determines an average intensity value R1 for all red pixel intensity values of the first image. In this example, the processing unit 14 determines an average intensity value R0 for all red pixel intensity values of the second image.

When holding the device within the crop canopy, the intensity values may be representative of older leaves within the crop canopy. When holding the device above the crop canopy, the intensity values may be representative of young leaves at the top of the crop. The younger leaves may better represent the current plant nutritional status.

When holding the device within the crop canopy, the average green intensity values G0, G1 may include a value representative of older leaves within the crop canopy. When holding the device above the crop canopy, the average green intensity values G0, G1 may include a value representative of young leaves at the top of the crop. The younger leaves may better represent the current plant nutritional status.

Then a G/R value, e.g. representative of a normalized and ambient light compensated green image component, is calculated using equation 16.

$$G/R = 100 * \left( \frac{G1 - G0}{R1 - R0} * C - 1 \right) \qquad \text{EQ 16}$$

This G/R value is representative of the average greenness of the crop canopy within the field of view of the device 1. Herein G1-G0 is the first color value, here the green color value. This average greenness is normalized with respect to non-green (here red) image components. Herein R1-R0 is the second color value, here the red color value. This average greenness is compensated for ambient light by subtraction of the image intensity values for the image without illumination by the light source 4. This G/R value is representative of average chlorophyll content of the part of the crop canopy within the field of view of the device 1. The device 1 can show the determined value to the user, e.g. on the user interface. It is also possible that the device 1 indicates information representative of the value on the user interface.

It will be appreciated that in this example the calibration constant C is includes a first calibration constant $$\frac{1}{Gr1 - Gr0}$$

in view of the green color value and a second calibration constant $$\frac{1}{Rr1 - Rr0}$$

in view of the red color value.

It will be appreciated that the G/R value calculated according to equation EQ16 is only one example of a plant status. More in general, the device can determine a plant status, such as a plant nutritional status, on the basis of a first and second color value. The device can e.g. determine a plant status, such as a plant nutritional status, on the basis of various mathematical combinations of the available (i. e. R, G and B) color values. For example, the processing unit can determine a hue value on the basis of the first and second color value.

In this example, the device 1 stores information representative of the determined G/R value in a record in the memory 22.

In this example, the position determination unit 18 determines a position of the device 1 during the measurement. Information representative of the position is stored in the record with the information representative of the determined G/R value. The record can be stored for access and analysis.

Alternatively, or additionally, the device 1 can transmit the determined status of the plants, or a parameter derived therefrom, e.g. in combination with the location information to an applicator system, e.g. a variable rate applicator system, such as a variable rate fertilizer system, using the communication unit 16. The applicator system can then adjust the rate of fertilizer application to the received status information. Hence, the use of fertilizers may be optimized, e.g. reduced, by precisely applying agricultural products to individual plants or locations to be treated.

In the example of FIGS. 1A, 1B and 2 the device is embodied as a smartphone. The smartphone includes the camera 2, light source 4, processing unit 14, communications unit 16 and position determination unit 18. In this example, the smartphone is provided with dedicated software, such as an app, enabling the smartphone to perform the functionality as described hereinabove.

Figure 3:
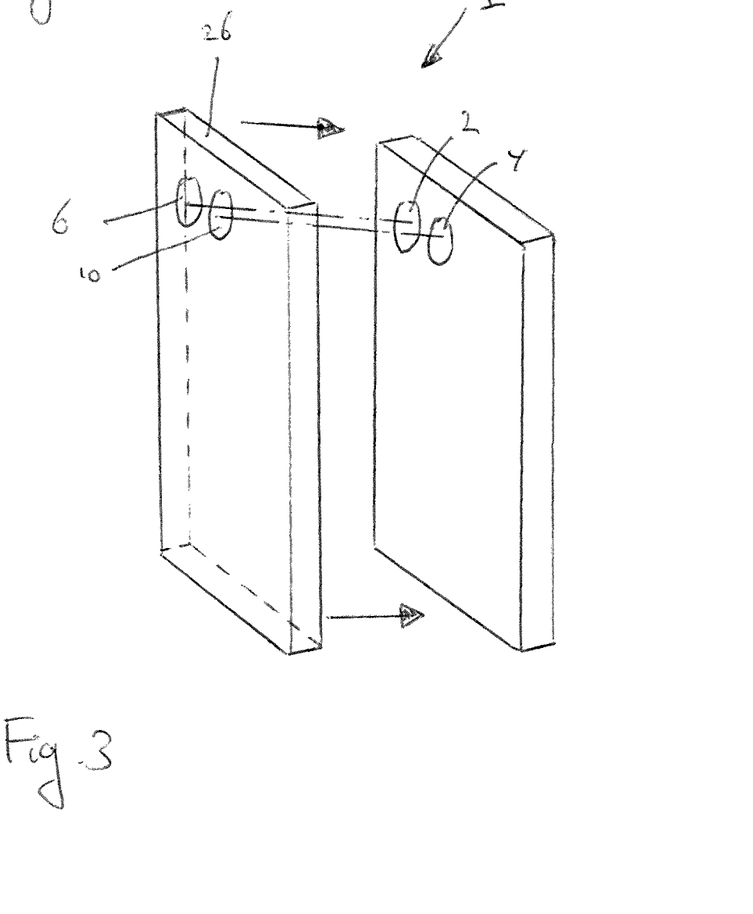
FIG. 3 shows a schematic representation of a casing.

In the example, the first polarization filter 6 and the second polarization filter 10 are included in a casing 26 for the smartphone. The casing is arranged for being attached to the smartphone, e.g. by clicking. The first polarization filter 6 is positioned in the casing 26 to cover a camera lens of the smartphone. The second polarization filter 10 is positioned in the casing 26 to cover the light source 4 of the smartphone. The casing 26 can be provided as a separate add-on unit for converting the smartphone to the device with the polarization filters. Optionally, the casing is provided in combination with a token. The token allows the dedicated software to be installed and/or used on the smartphone. The token can e.g. include an indication of a location, such as a URL, where the dedicated software can be downloaded. The location can be a secure location. The token can e.g. include an authentication allowing the location to be reached and/or allowing the dedicated software to be downloaded and/or installed, and/or allowing the software to be executed on the smartphone.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the example, the processing unit controls the camera and the light source to take two consecutive images in response to a user activation. It will be appreciated that it is also possible that the processing unit controls the camera and the light source to take more than two images in response to a user activation. For example, the device can consecutively take images without-with-without the light source active. Starting a sequence with an image without illumination may help in synchronizing camera and the light source for the image with light source illumination with, e.g. in devices that may have difficulties in synchronizing such as certain smartphones. The initial image without illumination may be discarded in the determination of the status of the plants. It is also possible that the process unit controls the camera and light source to take a plurality of pairs of images in response to a single user command. For each pair of images the status of the plants can be determined. The statuses of the plants for the consecutive pairs of images can e.g. be stored and/or averaged.

In the examples, the device is designed as a smartphone. It will be appreciated that the device can also be a dedicated handheld device. It is also possible that the device is designed as another handheld device such as a tablet, laptop, etc.

In the examples, the processing unit determines the value representative of a status of the plants for the entire image. It will be appreciated that the processing unit can also determine a, e.g. intensity, value representative of a status of the plants for one or more parts of the image.

In the example, the processing unit determines the value representative of a status of the plants as a ratio of green and red image pixel intensities. It will be appreciated that also other mathematical combination of the available pixel intensities can be used.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. Handheld device for determining a status of one or more plants comprising:
   a digital color camera arranged for obtaining a color image of plants within a field of view, the color image including pixels, each of which comprises at least a red (R), green (G) and blue (B) color component, together forming a set of color components;
   a light source arranged for providing broadband illumination at least to the plants within the field of view;
   a processing unit arranged for controlling the camera and the light source for obtaining a first image of the plants while the light source illuminates the plants with the broadband illumination, and obtaining a second image of the plants while the light source does not illuminate the plants,
   wherein the processing unit is arranged for performing at least the following operations:
   (i) determining a first color value representative of a difference in intensity values in the first and the second image for a first of the color components;
   (ii) determining a second color value representative of a difference in intensity values in the first and the second image for a second of the color components;
   (iii) calculating a value representative of a status of the plants using the first color value and the second color value,
   wherein the processing unit is arranged for calibrating the first color value, second color value, and optional third color value, and
   wherein the processing unit is arranged for calibrating the first, second or third color value by for that color value:
   a) multiplying the color value by a calibration value, C, determined as a reference value divided by the difference of the average intensity value in a first reference image, of a reference object with a uniform reflectance while the light source illuminates the reference object with the broadband illumination, and the average intensity value in a second reference image, of the reference object while the light source does not illuminate the reference object, for that color component; or
   b) multiplying the color value by a calibration value, C, determined as a reference value divided by an average of the difference in intensity values per pixel in the first reference image and the second reference image for that color component; or
   c) by per pixel multiplying the color value by a calibration value, $C_i$, determined as a reference value divided by the difference in intensity values in the first reference image and the second reference image for the that color component per pixel; or
   d) by per block of pixels for that color value multiplying the color value by a calibration value determined as a reference value divided by an average of the difference in intensity values per pixel in the first reference image and the second reference image for that color component.

2. Handheld device according to claim 1, wherein the value representative of the status of the plants is calculated:
   a) by determining the first color value as the difference of the pixel-averaged intensity value in the first image and in the second image for the first of the color components; determining the second color value as the difference of the pixel-averaged intensity value in the first and in the second image for the second of the color components; and calculating the value representative of the status of the plants using the first color value and the second color value; or
   b) by determining the first color value as an average of the difference in intensity values per pixel in the first and the second image for the first of the color components; determining the second color value as an average of the difference in intensity values per pixel in the first and the second image for the second of the color components; and calculating the value representative of the status of the plants using the first color value and the second color value; or
   c) by determining the first color value as the difference in intensity values in the first and the second image for the first of the color components per pixel; determining the second color value as the difference in intensity values in the first and the second image for the second of the color components per pixel; and calculating the value representative of the status of the plants by averaging a pixelwise value representative of the status of the plants obtained using the first color value per pixel and the second color value per pixel.

3. Handheld device according to claim 1, wherein the processing unit is further arranged for determining a third color value representative of a difference in intensity values in the first and the second image for a third of the color components; and calculating the value representative of the status of the plants using the first color value, the second color value, and the third color value.

4. Handheld device according to claim 3, wherein the processing unit is arranged for, in step (iii), calculating said value representative of the status of the plants based on a hue value using the first, second and third color value.

5. Handheld device according to claim 1, wherein the processing unit is arranged for, in step (iii), calculating said value representative of the status of the plants based on a ratio of the first color value and the second color value.

6. Handheld device according to claim 5, wherein the first of the color components is green (G) and the second of the color components is red (R).

7. Handheld device according to claim 1, wherein the reference value is a constant, such as:
   a) a maximum possible intensity value;
   b) a maximum intensity value encountered in the first reference image for that color component;
   c) a maximum difference in average intensity values in the first reference image and the second reference image for that color component; or
   d) a, e.g. known, reflectance value of the reference object, e.g. for the respective color component.

8. Handheld device according to claim 1, wherein at least one color component is selected to be less sensitive to changes in the plant status than the other of the color components.

9. Handheld device according to claim 1, wherein the processing unit is arranged for controlling the camera and the light source for obtaining the first and second image in response to a single user command.

10. Handheld device according to claim 1, wherein the camera includes a first polarization filter, and the light source includes a second polarization filter, wherein the first and second polarization filters are cross-polarized.

11. Handheld device according to claim 1, wherein the device includes a smartphone or a tablet.

12. Device according to claim 1, the device including a communications unit arranged for communicating the determined status of the plants, or a parameter derived therefrom, to an applicator system, such as a fertilizer, fertigation, watering, etc. system.

13. Agricultural system including a device according to claim 12 and an applicator system, such as a fertilizer, fertigation, watering, etc. system, in communication with said device.

14. A non-transitory computer-readable recording medium for determining a status of one or more plants, the non-transitory computer readable recording medium storing software code portions arranged for, when executed on a programmable device, causing the device to:
   obtain a first image of plants with a digital color camera of the device while a light source of the device illuminates the plants with broadband illumination,
   obtain a second image of the plants with the digital color camera while the light source does not illuminate the plants,
   calculate a status of the plants by:
   (i) determining a first color value representative of a difference in intensity values in the first and the second image for a first of the color components;
   (ii) determining a second color value representative of a difference in intensity values in the first and the second image for a second of the color components; and
   (iii) calculating a value representative of a status of the plants using the first color value and the second color value, and
   calibrate the first, second or a third color value by for that color value:
   a) multiplying the color value by a calibration value, C, determined as a reference value divided by the difference of the average intensity value in a first reference image, of a reference object with a uniform reflectance while the light source illuminates the reference object with the broadband illumination, and the average intensity value in a second reference image, of the reference object while the light source does not illuminate the reference object, for that color component; or
   b) multiplying the color value by a calibration value, C, determined as a reference value divided by an average of the difference in intensity values per pixel in the first reference image and the second reference image for that color component; or
   c) by per pixel multiplying the color value by a calibration value, determined as a reference value divided by the difference in intensity values in the first reference image and the second reference image for the that color component per pixel; or
   d) by per block of pixels for that color value multiplying the color value by a calibration value determined as a reference value divided by an average of the difference in intensity values per pixel in the first reference image and the second reference image for that color component.

15. Method for determining a status of one or more plants using a device including a digital color camera arranged for obtaining a color image of plants within a field of view, the color image including pixels, each of which comprises at least a red (R), green (G) and blue (B) color component, together forming a set of color components, a light source arranged for providing broadband illumination at least to the plants within the field of view, and a processing unit, the method including:
- obtaining, using the camera, a first image of the plants while the light source illuminates the plants with the broadband illumination,
- obtaining, using the camera, a second image of the plants while the light source does not illuminate the plants, and
- calculating a status of the plants by having the processing unit:
  - (i) determine a first color value representative of a difference in intensity values in the first and the second image for a first of the color components;
  - (ii) determine a second color value representative of a difference in intensity values in the first and the second image for a second of the color components; and
  - (iii) calculate a value representative of a status of the plants using the first color value and the second color value,
- wherein the method further comprises calibrating the first, second or a third color value by for that color value:
  - a) multiplying the color value by a calibration value, C, determined as a reference value divided by the difference of the average intensity value in a first reference image, of a reference object with a uniform reflectance while the light source illuminates the reference object with the broadband illumination, and the average intensity value in a second reference image, of the reference object while the light source does not illuminate the reference object, for that color component; or
  - b) multiplying the color value by a calibration value, C, determined as a reference value divided by an average of the difference in intensity values per pixel in the first reference image and the second reference image for that color component; or
  - c) by per pixel multiplying the color value by a calibration value, $C_i$, determined as a reference value divided by the difference in intensity values in the first reference image and the second reference image for the that color component per pixel; or
  - d) by per block of pixels for that color value multiplying the color value by a calibration value determined as a reference value divided by an average of the difference in intensity values per pixel in the first reference image and the second reference image for that color component.

16. Method according to claim 15 including taking an action, such as watering, fertilizing, harvesting, shielding (e.g. from the sun), ventilating, and/or heating, on the basis of the value calculated in step (iii).

* * * * *